US009164735B2

(12) United States Patent
Hux et al.

(10) Patent No.: US 9,164,735 B2
(45) Date of Patent: Oct. 20, 2015

(54) ENABLING POLYMORPHIC OBJECTS ACROSS DEVICES IN A HETEROGENEOUS PLATFORM

(71) Applicants: William Allen Hux, Hillsboro, OR (US); Nicolas Galoppo Von Borries, Portland, OR (US)

(72) Inventors: William Allen Hux, Hillsboro, OR (US); Nicolas Galoppo Von Borries, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 13/628,196

(22) Filed: Sep. 27, 2012

(65) Prior Publication Data

US 2014/0089905 A1    Mar. 27, 2014

(51) Int. Cl.
*G06F 9/44* (2006.01)
*G06F 9/45* (2006.01)

(52) U.S. Cl.
CPC .. *G06F 8/24* (2013.01); *G06F 8/41* (2013.01); *G06F 8/47* (2013.01)

(58) Field of Classification Search
None
See application file for complete search history.

(56) References Cited

U.S. PATENT DOCUMENTS

| | | | | |
|---|---|---|---|---|
| 5,764,991 | A * | 6/1998 | Carcerano | 717/140 |
| 6,106,569 | A * | 8/2000 | Bohrer et al. | 717/100 |
| 6,163,813 | A * | 12/2000 | Jenney | 719/315 |
| 6,199,197 | B1 * | 3/2001 | Engstrom et al. | 717/100 |
| 6,457,172 | B1 * | 9/2002 | Carmichael et al. | 717/141 |
| 2008/0022278 | A1 * | 1/2008 | Gschwind et al. | 718/100 |
| 2008/0244507 | A1 * | 10/2008 | Hodson et al. | 717/106 |
| 2008/0256330 | A1 * | 10/2008 | Wang et al. | 712/24 |
| 2010/0153934 | A1 * | 6/2010 | Lachner | 717/146 |
| 2010/0180266 | A1 * | 7/2010 | Hiniker | 717/140 |
| 2012/0174080 | A1 * | 7/2012 | Gandolfi et al. | 717/136 |
| 2013/0141443 | A1 * | 6/2013 | Schmit et al. | 345/505 |

FOREIGN PATENT DOCUMENTS

WO    WO2011/053303    *  5/2011

OTHER PUBLICATIONS

Saha et al., "Programming Model for a Heterogeneous x86 Platform," 2009, ACM 978-1-60558-392-Jan. 9, 2006, pp. 1-10.*

(Continued)

*Primary Examiner* — Thuy Dao
*Assistant Examiner* — Stephen Berman
(74) *Attorney, Agent, or Firm* — Blakely, Sokoloff, Taylor & Zafman LLP

(57) ABSTRACT

In accordance with disclosed embodiments, there are provided methods, systems, and apparatuses enabling polymorphic objects across devices in a heterogeneous platform. According to the disclosed embodiments, such means include, for example, receiving, at a device aware compiler, source code for a computer program as input; compiling the source code for the computer program, in which the compiling includes at least: generating two distinct sets of executable binary instructions for a method of an object; in which a first of the two distinct sets of executable binary instructions for the method of the object provides first binary instructions for the method executable by a first computing device and not executable by a second computing device; and in which a second of the two distinct sets of executable binary instructions for the method of the object provides second binary instructions for the method executable by the second computing device and not executable by the first computing device. Other related embodiments are disclosed.

27 Claims, 12 Drawing Sheets

(56) References Cited

OTHER PUBLICATIONS

Wikipedia, "Cross Compiler," 2008, downloaded from the Wayback Machine Internet Archive, pp. 1-7.*

Wikipedia, "Embedded System," 2008, downloaded from the Wayback Machine Internet Archive, pp. 1-9.*

Wikipedia, "Hash Table," 2012, downloaded from the Wayback Machine Internet Archive, pp. 1-17.*

Wikipedia, "Name Mangling," 2011, downloaded from the Wayback Machine Internet Archive, pp. 1-10.*

Wikipedia, "Globally Unique Identifier," 2011, downloaded from the Wayback Machine Internet Archive, pp. 1-7.*

Banerjee et al., "A MATLAB compiler for distributed, heterogeneous, reconfigurable computing systems," 2000, IEEE Symposium on Field-Programmable Custom Computing Machines, pp. 39-48.*

Vignesh et al., Compiler and runtime support for enabling generalized reduction computations on heterogeneous parallel configurations,' 2010, ICS '10 Proceedings of the 24th ACM International Conference on Supercomputing, pp. 137-146.*

Linderman et al., "Merge: a programming model for heterogeneous multi-core systems," 2008, ASPLOS XIII Proceedings of the 13th international conference on Architectural support for programming languages and operating systems, pp. 287-296.*

* cited by examiner

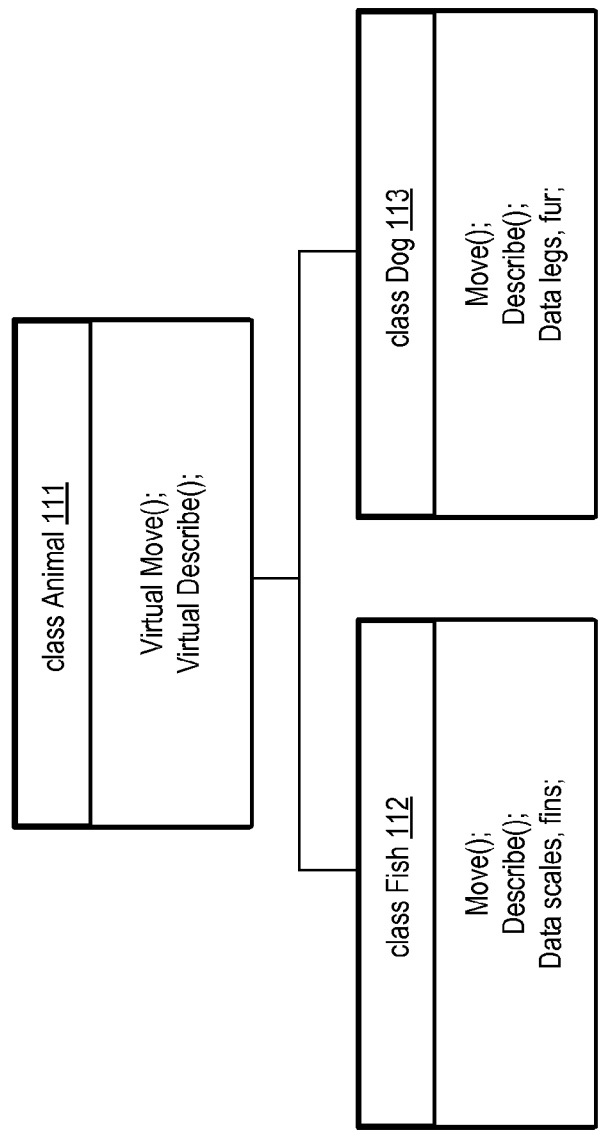

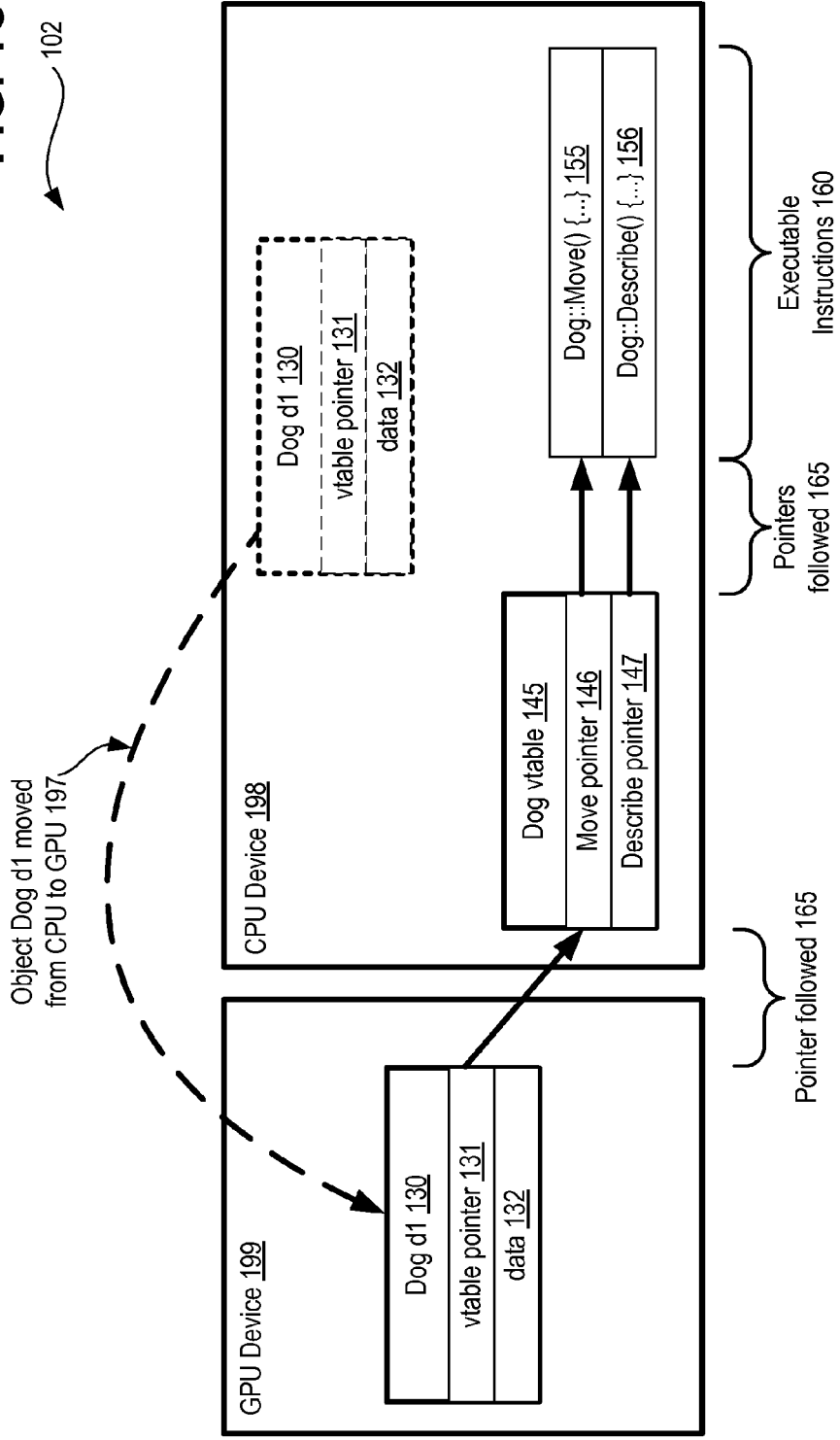

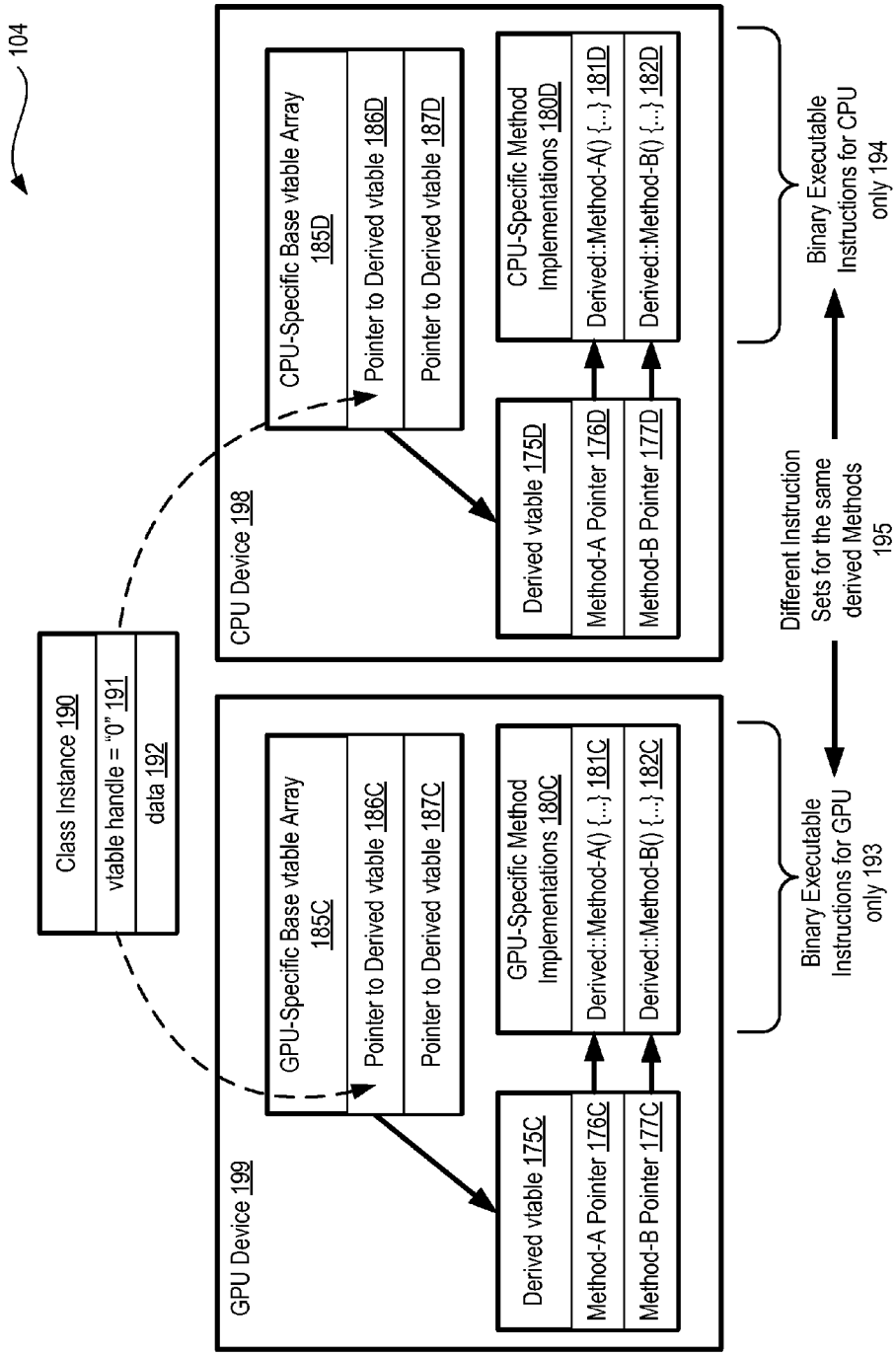

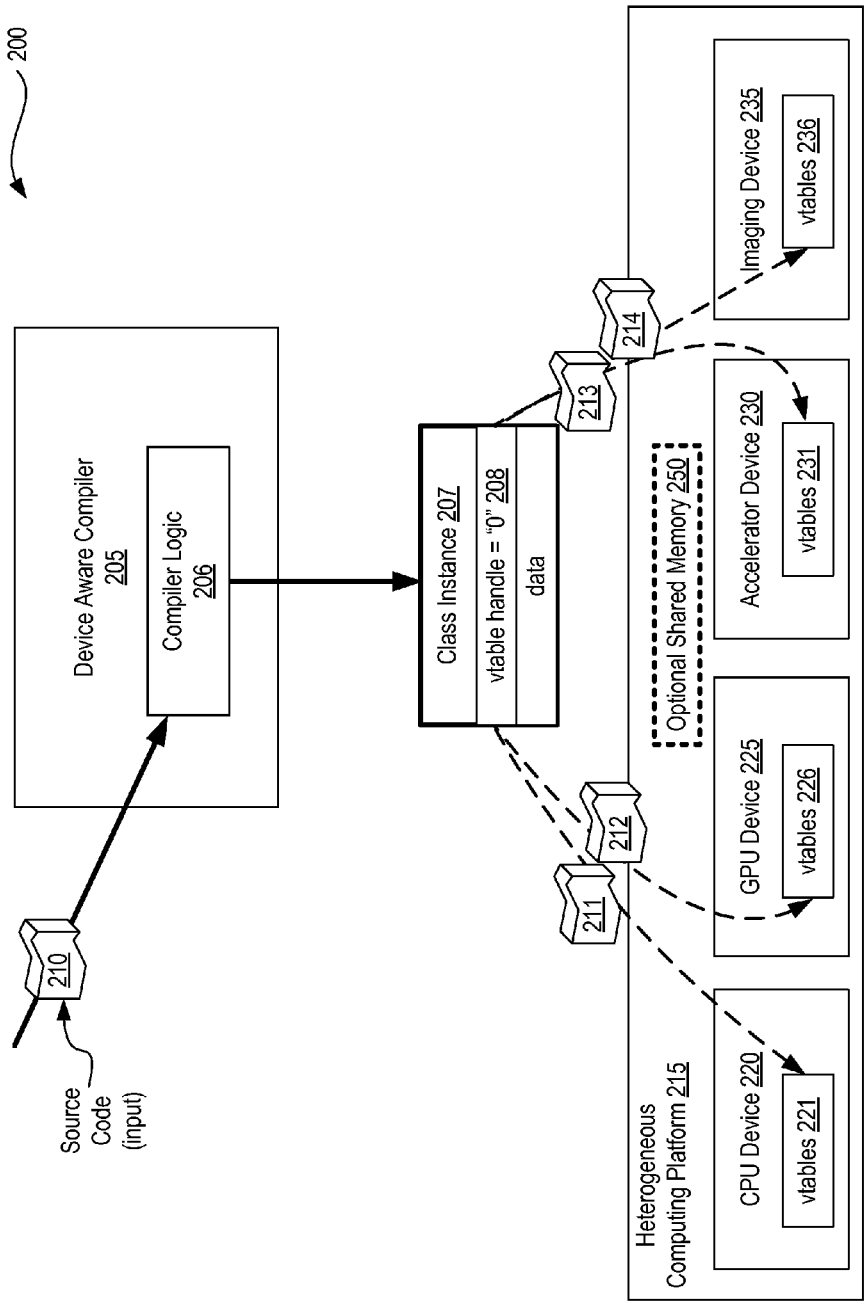

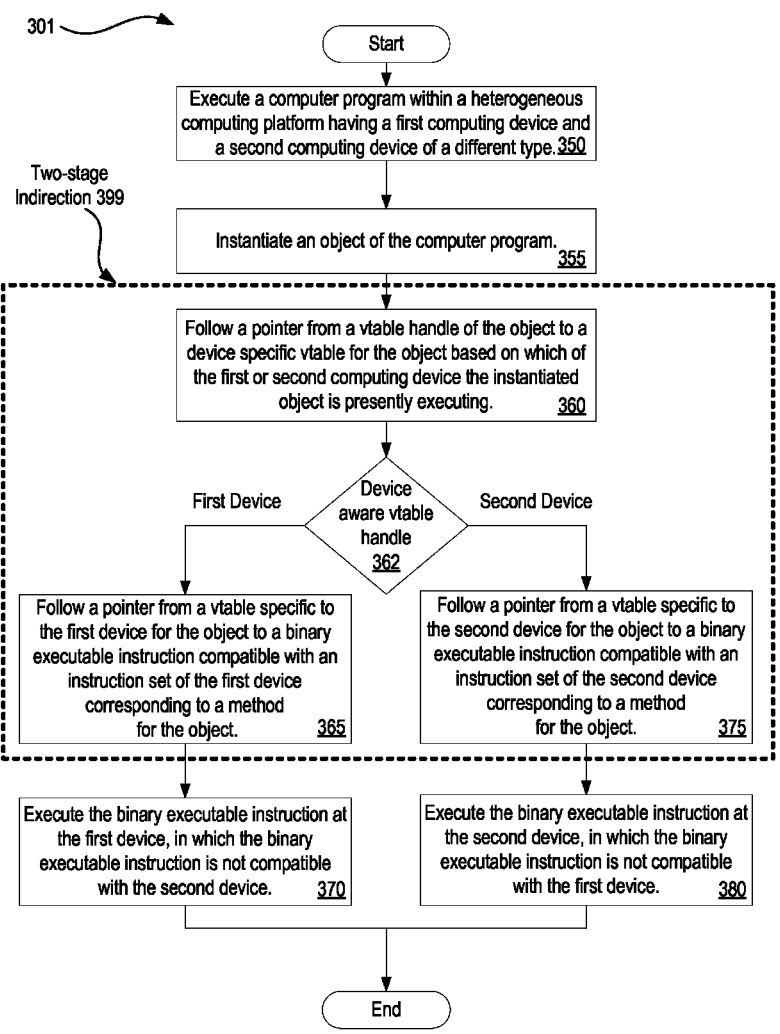

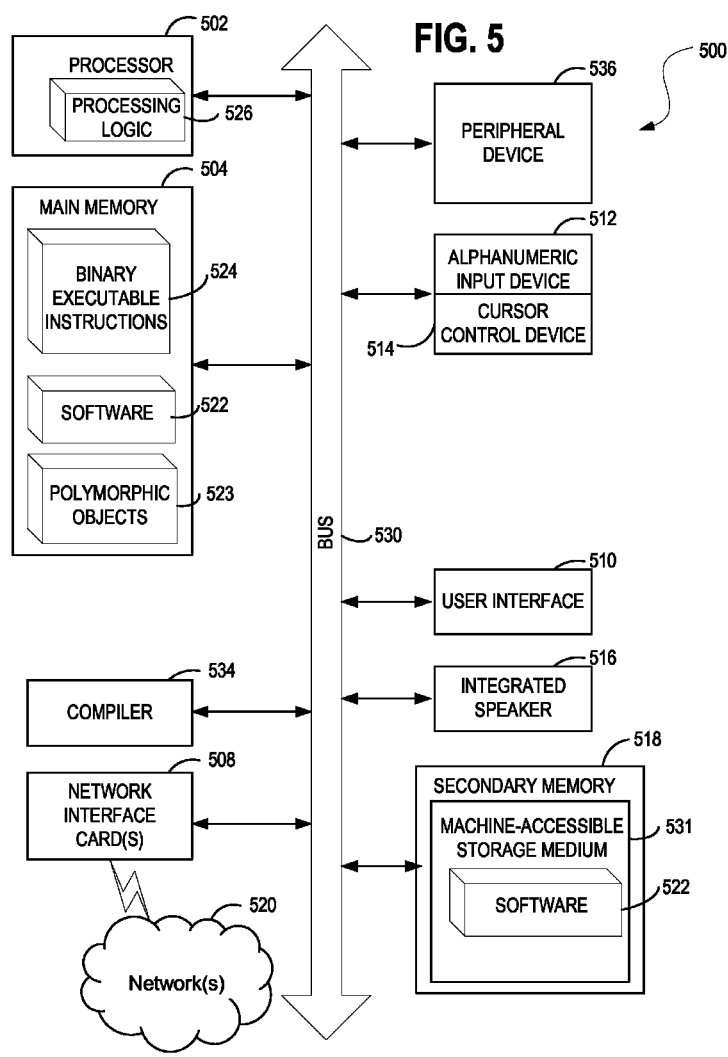

ENABLING POLYMORPHIC OBJECTS ACROSS DEVICES IN A HETEROGENEOUS PLATFORM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for enabling polymorphic objects across devices in a heterogeneous platform.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In computer science, polymorphism is a programming language feature that allows values of different data types to be handled using a uniform interface. A function that can evaluate or be applied to values of different types is known as a polymorphic function. A data type that can appear to be of a generalized type (e.g., a list with elements of arbitrary type) is designated polymorphic data type like the generalized type from which such specializations are made.

Different kinds of polymorphism are known. For instance, if a function denotes different and potentially heterogeneous implementations depending on a limited range of individually specified types and combination, it is called ad-hoc polymorphism. Ad-hoc polymorphism is supported in many languages using function and method overloading.

Conversely, if code is written without mention of any specific type and thus can be used transparently with any number of new types, it is called parametric polymorphism. Parametric polymorphism is widely supported in statically typed functional programming languages. In the object-oriented programming community, programming using parametric polymorphism is sometimes called generic programming.

In object-oriented programming, subtype polymorphism or inclusion polymorphism is a concept in type theory wherein a name may denote instances of many different classes as long as they are related by some common super class. Inclusion polymorphism is generally supported through subtyping, that is to say, objects of different types may be substituted for objects of another type, and thus can be handled via a common interface.

As beneficial as polymorphism is to programmers, its practicality is severely limited when used on computing platforms having non-uniform and heterogeneous computing hardware.

For instance, with conventional methodologies, the targeted computing platform upon which code is expected to run is homogenous, such as a computing platform using a conventional Central Processor Unit (CPU). During execution of code developed using these conventional methodologies, it is assumed that a pointer followed will arrive at an appropriate instruction for execution via the exemplary CPU. This assumption has been safe historically because homogenous systems, such as those having only a CPU or multiple CPUs of the same type for executing instructions, were so common place.

Unfortunately, in a heterogeneous computing platform having multiple non-uniform hardware components, each of which being capable to execute instructions, the preceding assumption may be erroneous. Thus, use of the conventional methodologies results in the following of a pointer that may yield a result incapable of being executed by one of the hardware components in the non-uniform environment.

The present state of the art may therefore benefit from systems and methods for enabling polymorphic objects across devices in a heterogeneous platform as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1A illustrates an exemplary architecture in accordance with which embodiments may operate;

FIG. 1C illustrates another exemplary architecture in accordance with which embodiments may operate;

FIG. 1E illustrates another exemplary architecture in accordance with which embodiments may operate;

FIG. 2A illustrates another exemplary architecture in accordance with which embodiments may operate;

FIGS. 3A and 3B set forth flow diagrams illustrating methods for enabling polymorphic objects across devices in a heterogeneous platform in accordance with described embodiments;

FIG. 5 illustrates a diagrammatic representation of a machine in the exemplary form of a computer system, in accordance with one embodiment.

DETAILED DESCRIPTION

Figure 1B:
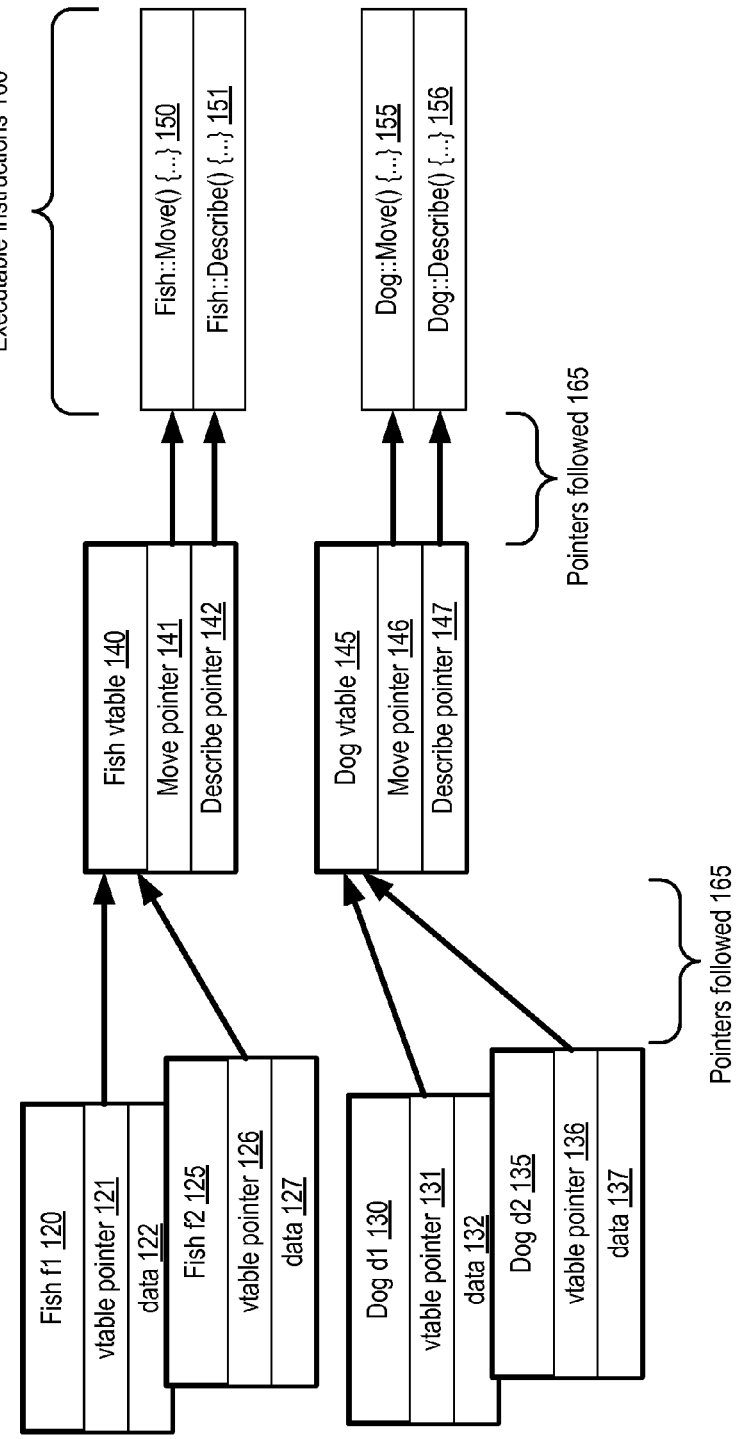
FIG. 1B illustrates another exemplary architecture in accordance with which embodiments may operate.

Described herein are systems, apparatuses, and methods enabling polymorphic objects across devices in a heterogeneous platform. For example, in one embodiment, such means may include receiving, at a device aware compiler, source code for a computer program as input; compiling the source code for the computer program, in which the compiling includes at least: generating two distinct sets of executable binary instructions for a method of an object; in which a first of the two distinct sets of executable binary instructions for the method of the object provides first binary instructions for the method executable by a first computing device and not executable by a second computing device; and in which a second of the two distinct sets of executable binary instructions for the method of the object provides second binary instructions for the method executable by the second computing device and not executable by the first computing device.

Modern computing platforms now exist with non-uniform and heterogeneous computing hardware, in which multiple of the individual components within the computing platform are each individually capable of executing instructions. For instance, consider a computing device such as a laptop or smartphone that includes both a Central Processing Unit (CPU) and also a Graphics Processing Unit (GPU). Each of the CPU and also the GPU may execute instructions. However, this does not mean that they are capable of executing the same underlying binary code. Each of the CPU and the GPU have differing architectures, and thus, each requires a different instruction to perform an otherwise equivalent operation.

A CPU within a computing device carries out instructions of a computer program by performing the basic arithmetical, logical, and input/output operations. A GPU (occasionally referred to as a Visual Processing Unit (VPU)) is conversely a specialized electronic circuit designed to rapidly manipulate and alter memory to accelerate the building of images in a frame buffer intended for output to a display. Each of the CPU and the GPU are tailored to different needs. For instance, GPUs are very efficient at manipulating computer graphics, and their highly parallel structure makes them more effective than a CPU for algorithms where processing of large blocks of data is done in parallel, such as when rendering display output.

A compiler is a computer program or set of programs that transforms source code written in a higher level programming language into another computer language, the target language, typically having a binary form known as object code. The most common reason for transforming source code into the target language is to create an executable program.

When code is compiled for execution on a computing platform, the compiler must translate the higher level programming language code into instructions that are executable by the computing platform. More specifically, the higher level programming language code must be compiled into instructions for a CPU if they are to be executed by a CPU or compiled into a GPU if the instructions are to be executed by a GPU. Similarly, if other components or different components are present and capable to execute instructions, such as an accelerator or an imaging device, then the compiler must appropriately compile executable instructions for the targeted computing hardware component.

Conventional solutions do not provide the capability to compile code that is capable to execute on a heterogeneous computing platform, having multiple distinct computing components, each requiring different instructions for performing the same computational function. For instance, conventional mechanisms do not compile code that is "aware" or capable to distinguish among the underlying hardware components within a heterogeneous computing platform and able to select and execute the appropriate instruction corresponding to a given hardware component, such as the CPU, the GPU, or an accelerator, etc. Instead, compiled code is targeted for only one such component, with the assumption that the computing platform is homogenous.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A illustrates an exemplary architecture 100 in accordance with which embodiments may operate.

The architecture 100 set forth at FIG. 1 depicts a class hierarchy showing the "Animal" class at element 111 with two virtual methods "Move" and "Describe." Derived therefrom are the "Fish" class at element 112 and the "Dog" class at element 113, each of the derived classes 112 and 113 defining different implementations of the same behaviors with different attributes. Class Fish at element 112 additionally specifies Data as scales and fins and class Dog at element 113 additionally specifies Data as legs and fur.

Using the example from FIG. 1A with the exemplary base class Animal 111, for each polymorphic object inheriting the base information, it is known from the parent object how to perform the "Move" and "Describe" operations, but each inheriting object presents their own respective version of the "Move" and "Describe" operations.

FIG. 1B illustrates another exemplary architecture 101 in accordance with which embodiments may operate.

Object oriented programming languages, such as C++ and others, support polymorphism, that is, the ability of objects belonging to different types to respond to method, field, or property calls of the same name, each one according to an appropriate type-specific behavior. The programming languages implement such capability by storing a pointer in each object instance to a shared virtual function table (vtable), in which the vtable contains a pointer for every polymorphic function in the class pointing to the specific version of the function that corresponds to that instance.

As can be seen from FIG. 1B, each of the respective classes have a pointer linking to a class vtable, which in turn provides pointers that may be followed to an appropriate instruction for execution.

More particularly, each object derived from class Animal at element 111 from FIG. 1A has a pointer to a vtable. As depicted at FIG. 1B, Fish f1 at element 120 includes a vtable pointer 121 and data 122 and Fish F2 at element 125 includes vtable pointer 126 and data 127. Similarly, Dog d1 at element 130 includes vtable pointer 131 and data 132 and Dog d2 at element 135 includes vtable pointer 136 and data 137.

While each of Fish f1 and Fish f2 have distinct data (122 and 127 respectively), the vtable pointer for each of Fish f1 and Fish f2 both point to the same Fish vtable at element 140. Similarly, Dog d1 and Dog d2 each have distinct data also (132 and 137 respectively), yet, the vtable pointer for each of Dog d1 and Dog d2 both point to the same Dog vtable at element 145 when the pointers are followed (element 165).

In turn, each vtable includes pointers to implementations of the methods that correspond to the given class, the implementations being executable instructions (element 160). Thus, Fish vtable 140 includes Move pointer 141 which points to Fish::Move( ) { . . . } at element 150 and Describe pointer 142 which points to Fish::Describe( ) { . . . } at element 151. Similarly, the Dog vtable 145 includes Move pointer 146 which points to Dog::Move( ) { . . . } at element 155 and Describe pointer 147 which points to Dog::Describe( ) { . . . } at element 156.

However, using the exemplary architecture, should an object be instantiated on a first hardware component using one of the provided derived classes (e.g., 120, 125, 130, and 135), such as a being instantiated on a CPU, but then be copied to another different hardware component, such as a GPU where the object was not initially instantiated, then the vtable pointer stored and associated with the corresponding object will not be valid, and will point to, for example, executable instructions for the CPU that cannot be performed by the GPU. Other problems may also arise; for example, the pointer may not be in the right address space, such as being within an address space valid on the CPU but not valid for the GPU. Alternatively, if the exemplary CPU and GPU are able to share a common address space, then the referenced vtable pointer may point to compiled executable binary code for the wrong device, such as CPU executable code rather than GPU executable code or visa versa.

Thus, given any set of devices with dissimilar and non-uniform instruction sets or utilizing different memory address spaces in a common heterogeneous computing platform, the devices will not be able to share objects defined using conventionally defined vtables.

FIG. 1C illustrates another exemplary architecture 102 in accordance with which embodiments may operate. More particularly, each of GPU device 199 and CPU device 198 are depicted.

If an instance of the class Dog is moved from a first device of original instantiation to a different and non-uniform device, such as from CPU device 198 to GPU device 199, then its vtable will reflect a reference pointing back to the first device of original instantiation where it was created. In a platform with a common address space, the pointer may therefore erroneously reference executable instructions 160 that are incompatible with the different device, as the referenced instructions were compiled for the first device of original instantiation. For example, the object moved to a GPU may erroneously reference, by following the pointers 165, executable instructions 160 of the CPU. In a computing platform in which each distinct device has its own address space (e.g., not shared), the pointer may reference garbage or unknown data, which again is an erroneous result.

Element 197 and the curved hashed arrow indicates that object Dog d1 130 is moved from the CPU device 198 where it was instantiated to the GPU device 199, for further execution. Thus, when Dog d1 130 is referenced at GPU device 199, its vtable pointer 131 directs to the Dog vtable 145, which in turn, erroneously references either Dog::Move( ) { . . . } at element 155 or Dog::Describe( ) { . . . } at element 156, both of which are executable instructions 160 compiled for the CPU device 198 where the object was created, and both of which are not compatible with the different computing device requirements of GPU device 199 where the Dog d1 130 object was moved and later referenced. The GPU will not be able to execute the methods defined by object Dog d1 130 now executing at the GPU device 199, because the GPU device 199 uses a different instruction set than the CPU device 198, hence the two components being non-uniform and each part of a heterogeneous computing platform.

Figure 1D:
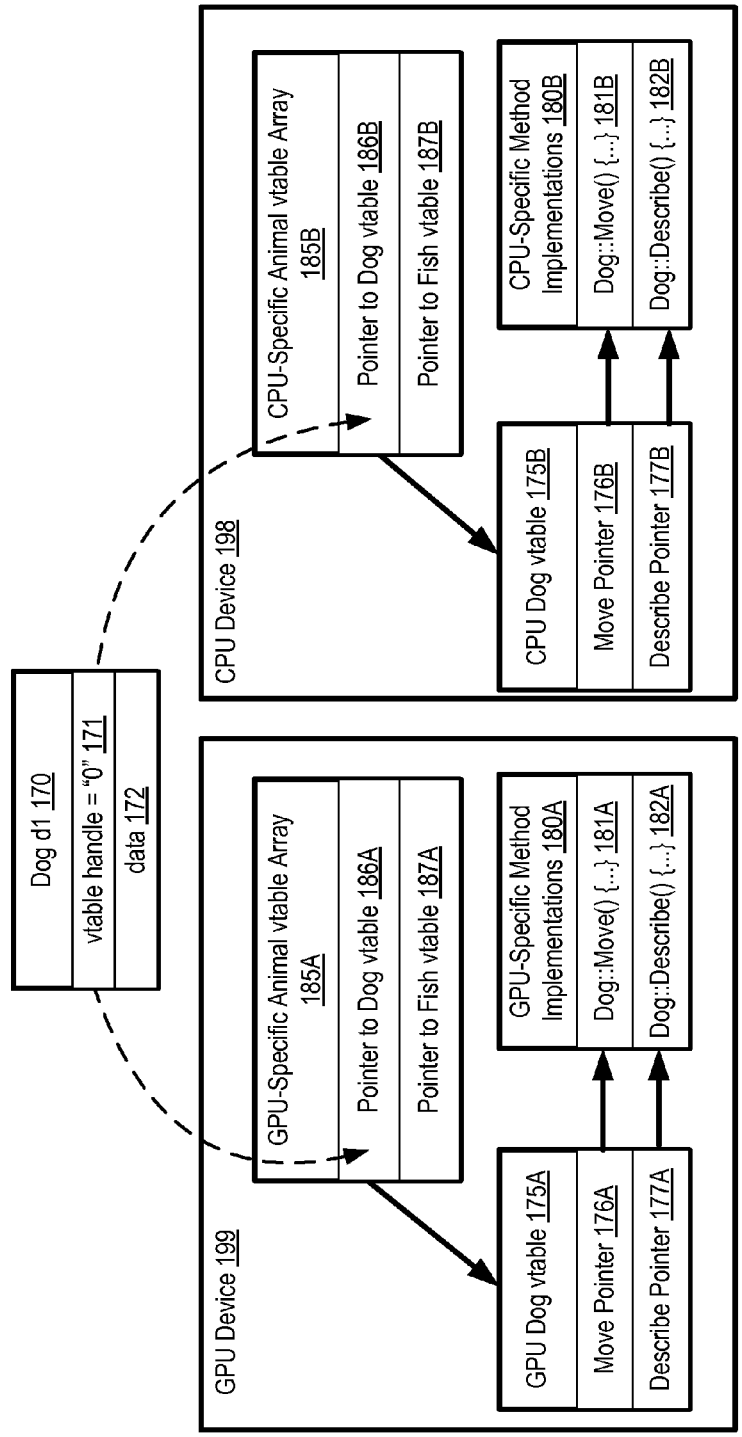
FIG. 1D illustrates another exemplary architecture in accordance with which embodiments may operate.

FIG. 1D illustrates another exemplary architecture 103 in accordance with which embodiments may operate. In particular, a two-stage virtual function table is introduced allowing a non-uniform heterogeneous computing platform to support polymorphic objects to move between the distinct non-uniform devices, such as moving between a GPU device 199 and a CPU device, despite the fact that each device requires a different instruction set for performing the same operations of a given object.

As depicted, rather encoding the address of the vtable directly into an object, an additional layer of indirection is utilized which is device aware, such that the appropriate pointer can be referenced and followed for the object, to the appropriately compiled executable instruction for the device presently executing the object. Thus, objects executing at the GPU device 199 will be fulfilled with GPU-specific method implementations 180A regardless of the object's original instantiation location and objects executing at the CPU device 198 will be fulfilled with CPU-specific method implementations 180B, again without regard to the object's original instantiation location.

Thus, architecture 103 depicts an object Dog d1 170 having encoded therein a vtable handle="0" at element 171 rather than a vtable pointer. Object Dog d1 170 additionally includes data 172. The vtable handle 171 makes the object device aware, and thus, depending on where the object is presently executing, regardless of its original instantiation location, the vtable handle 171 directs to the GPU device 199 if the object is executing at the GPU device 199 and the vtable handle 171 directs to the CPU device 198 if the object is instead executing at the CPU device 198.

The GPU-specific animal vtable array 185A and CPU-specific animal vtable array 185B each include pointers to vtables for the Dog and Fish classes. The GPU-specific animal vtable array 185A includes pointer to Dog vtable 186A and pointer to Fish vtable 187A. Similarly, the CPU-specific animal vtable array 185B includes pointer to Dog vtable 186B and pointer to Fish vtable 187B.

On the GPU device 199 side, the pointer to Dog vtable 186A points to GPU Dog vtable 175A which provides references to the GPU-specific method implementations 180A or executable instructions compatible with the GPU Device 199 instruction set requirements. Thus, move pointer 176A points to Dog::Move( ) { . . . } 181A and describe pointer 177A points to Dog::Describe( ) { . . . } 182A.

On the CPU device 198 side, the pointer to Dog vtable 186B points to CPU Dog vtable 175B which provides references to the CPU-specific method implementations 180B or executable instructions compatible with the CPU Device 199 instruction set requirements. Thus, move pointer 176B points to Dog::Move( ) { . . . } 181B and describe pointer 177B points to Dog::Describe( ) { . . . } 182B.

Thus, consistent with the depicted architecture 103, a compiler is enabled for encoding the vtable handle 171 which is used to look up a device-specific vtable, which in turn points to device-compatible implementations of each virtual function.

Where each of the non-uniform devices making up the heterogeneous computing platform utilize a shared address space, the objects may be shared, transitioned, copied, or moved back and forth and the depicted architecture 103 will result in the appropriate executable instructions for the GPU device 199 being referenced when objects are executing at the GPU device and the appropriate executable instructions for the CPU device 198 being referenced when objects are executing at the CPU device. Although each set of instructions may reside within the same shared address space, each will reside at distinct locations and the architecture 103 described will yield, through the device aware vtable handle 171 and subsequent pointers, the appropriate location.

Where each of the non-uniform devices making up the heterogeneous computing platform utilized a non-shared dedicated or exclusive address space, the objects may again be shared, transitioned, copied, or moved back and forth and the depicted architecture 103 will result in the appropriate executable instructions for the GPU device 199 being referenced when objects are executing at the GPU device and the appropriate executable instructions for the CPU device 198 being referenced when objects are executing at the CPU device. Each address space of the distinct GPU and CPU devices may utilize a different data structure and potentially reside upon distinct memories, within which the underlying executable instruction resides, but the provided architecture 103, through the device aware vtable handle 171 and subsequently referenced pointers, will yield the appropriate location within the appropriate data structure. In another possible scenario, a computing platform may utilize different address spaces, yet compatible binary code. In such a scenario, the vtable pointers can be made to point to common bitcode through a device aware compiler.

The two-stage scheme described herein and depicted in detail at FIG. 1D may be implemented in various ways. For instance, in one embodiment, each component or device capable of executing instructions includes its own global array of vtables. For instance, GPU device 199 and CPU device 198 are each depicted as having a device specific vtable array at elements 185A and 185B respectively. In one embodiment, all of arrays of vtables are each identical in terms of array size. In such an embodiment where the arrays are consistent between devices, close communication between the compiler or compilers for each device is maintained such that the compiler(s) rendering the binary computer executable instructions for each of the respective devices can ensure consistency between the vtable arrays for the different devices, despite the fact that each will point to different instruction sets or binary executable instructions for the respective devices to implement the device specific methods. In one embodiment, the vtable handle 171 depicted at element 171 is simply an index into the device specific vtable arrays.

In another embodiment, each of the distinct devices (e.g., 198 and 199) keeps a separate array of vtables for each base class, each of the vtables being the same size. In such an embodiment, vtable handle at element 171 is an array index and each vtable array size equals the number of derived classes for a given base class. In such an embodiment, close coordination may again be required between the compiler or compilers for the respective devices.

In one embodiment, each of the distinct devices (e.g., 198 and 199) keeps its own "table of vtables." In such an embodiment, all "Dog" type objects will use the first entry in the table of tables, for instance, implemented as a 0-based array. The "Fish" type objects would then use vtable handle 171 with a value of "1." In a variation of such an embodiment, the "table of vtables" may be implemented on a per-object basis rather than a per-device basis. With such a variation, a "Dog" type object would point to the Dog table of vtables, and a "Fish" type object would point to the Fish table of vtables. Code running on the CPU device 198, for example, would thus always follow the first entry in the "vtable table," whereas code running on the GPU device 199, for example, would always follow the second entry, and so forth. In still another variation of such an embodiment, there is an array for each object type and the size of the array equals the number of devices for which the compiler is aware.

In yet another embodiment, each device (e.g., 198 and 199) maintains its own hash table of vtables in which the hash tables are not necessarily the same size on each device. For instance, it is possible that not all objects permissible are instantiated on all devices, and thus, the resulting hash table of the vtables may be different in size for each of the devices (198 and 199). In such an embodiment, the vtable handle at element 171 is a unique hash key formed from the mangled name of the class, for example, using C++ name mangling for C++ source code implementations.

In another embodiment, each of the distinct devices (e.g., 198 and 199) keeps a separate hash table of vtables per base class in which the hash tables of vtables again are not necessarily the same size for each of the devices. For example, where not all of the permissible objects are instantiated on all devices, the resulting hash table of vtables may differ in size between devices. In such an embodiment, the hash key is a function of the mangled name of the derived class. Smaller hash tables yield a lower risk of collisions and may therefore provide greater overall efficiency. Compiler optimizations may further be applied to amortize the cost of double de-references when there are multiple virtual function calls on the same base object within the same context, consistent with known compiler optimization techniques.

In yet another embodiment, each of the distinct devices (e.g., 198 and 199) keeps a hash table of vtables which as before, are not necessarily the same size on each device when less than all objects are instantiated for one or more of the devices. In such an embodiment, the vtable handle at element 171 is determined by assigning every class a global unique identifier, such as a Unique Identifier or "UID," as is available in some development environments, such as with Microsoft's Visual Studio projects. Still other implementation schemes are possible.

FIG. 1E illustrates another exemplary architecture 104 in accordance with which embodiments may operate. Here, class instance 190 is depicted having therein vtable handle="0" at element 191 and data 192. The vtable handle 191 is device aware and links to either the GPU-specific base vtable array at 185C for the GPU device 199 or links alternatively to the CPU-specific base vtable array at 185D for the CPU device 198.

A compiler or compilers which support the respective devices are used to create the various arrays, pointers, derived vtables, and derived method implementations shown in support of the respective devices, such as a GPU device compatible compiler for converting source code to binary executable instructions or instruction sets for the GPU device 199 and/or a CPU device compatible compiler for converting source code to binary executable instructions or instruction sets for the CPU device 198.

Use of an appropriate compiler therefore will generate device specific instruction sets which are referenced regardless of where an instantiated object is presently executing and regardless of where such an object is originally instantiated. In such a way, instantiated objects may be copied, moved, transferred, and so forth between devices within a heterogeneous computing platform and when their internal methods are called, the appropriate instruction set for the appropriate device will be located and properly executed.

Thus, the architecture 104 of FIG. 1E further depicts the GPU-specific base vtable array 185C of GPU device 199 as having pointers to derived vtables 186C and 187C. Pointer to derived vtable 186C points to the derived vtable 175C which includes two method pointers, Method-A pointer 176C which points to Derived::Method-A( ) { ... } 181C within the GPU-specific method implementations 180C and also Method-B pointer 177C which points to Derived::Method-B( ) { ... } 182C. With a similar structure, the CPU-specific base vtable array 185D of CPU device 198 includes pointers to derived vtables 186D and 187D. Pointer to derived vtable 186D points to the derived vtable 175D which includes two method pointers, Method-A pointer 176D which points to Derived::Method-A( ) { ... } 181D within the CPU-specific method implementations 180D and also Method-B pointer 177D which points to Derived::Method-B( ) { ... } 182D.

The GPU-Specific method implementations 180C provide binary executable instructions for GPU only as depicted by element 193, as provided by a compatible compiler, and the CPU-Specific method implementations 180D provide binary executable instructions for CPU only as depicted by element 194, as provided by such a compatible compiler. Each of the respective binary executable instructions 193 and 194 provide different instruction sets for the same derived methods as depicted by element 195. For instance, while each of the respective binary executable instructions 193 and 194 may be derived from identical methods, for instance, based on a common source code, each yields different instructions sets which are compatible with the appropriate device within a heterogeneous computing platform having non-uniform computing devices capable of executing instructions, but not capable of executing the same binary executable instructions due to differing instruction set requirements.

FIG. 2A illustrates another exemplary architecture 200 in accordance with which embodiments may operate. More particularly, a device aware compiler 205 is depicted having compiler logic 206 which is compatible with the methodologies and techniques described herein. Such compiler logic 206 takes as input, source code 210, for example, a program written in C++ or other such higher level programming language. The device aware compiler 205 is capable to render device specific binary executable instructions for execution by each of the multiple devices within a heterogeneous computing platform 215 having non-uniform computing devices each of which are able to execute binary instructions, but do so according to differing instruction set requirements. Thus the depicted device aware compiler 205 renders, for example, a class instance 207 which includes a vtable handle 208 rather than a pointer directly to binary computer executable instructions for a referenced method. The vtable handle 208 appropriately points to vtables for the various devices of the heterogeneous computing platform 215 based on the present location of execution for a given object. In such embodiments, the vtable handle 208 is filled out by a compiler or at runtime by any of the mechanisms described in accordance with the preceding paragraphs through use of the provided pointer 211, vtable handle 208, vtables 221 within CPU device 220, pointer 212, vtable handle 208, vtables 226 within GPU device 225, pointer 213, vtable handle 208, vtables 226 within accelerator device 230, pointer 214, vtable handle 208, and vtables 236 within imaging device 235.

In one embodiment, each of the devices 220, 225, 230, and 235 within the heterogeneous computing platform 215 utilize optional shared memory 250 of the heterogeneous computing platform 215, and each of the vtables 221, 226, 231, and 236 referenced by vtable handle 208 reside within the optional shared memory 250. In an alternative embodiment, each of the devices 220, 225, 230, and 235 within the heterogeneous computing platform 215 utilize address space which is exclusive to the respective device, and the vtables 221, 226, 231, and 236 referenced by vtable handle 208 reside within the respective address spaces of the corresponding devices 220, 225, 230, and 235.

Figure 2B:
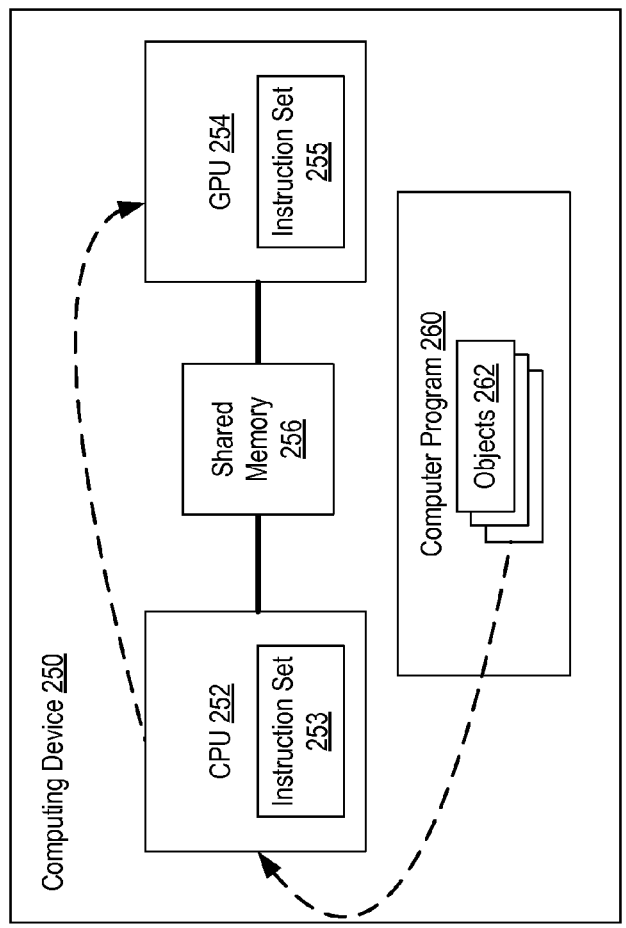
FIG. 2B illustrates another exemplary architecture in accordance with which embodiments may operate.

FIG. 2B illustrates another exemplary architecture 201 in accordance with which embodiments may operate. More particularly, a computing device 250 is depicted having therein, a Central Processing Unit (CPU) 252 embodying a first instruction set 253; a Graphics Processing Unit (GPU) 254 embodying a second instruction set 255 different than the first instruction set 253 of the CPU 252; a shared memory 256 operable in conjunction with both the CPU 252 and the GPU 254; and a computer program 260 having a plurality of objects 262 therein, each capable of instantiation and execution at one or both of the GPU 254 and the CPU 252. And further in which the computer program 260 causes the computing device 250 to: (i) instantiate one of the plurality of objects 262 of the computer program 260 at the CPU 252, (ii) move the object 262 instantiated at the CPU 252 to the GPU 254 for further execution, (iii) invoke a method of the object 262 at the GPU 254, and (iv) execute binary instructions referenced by the invoked method of the object 262, in which the binary instructions are executed by the GPU 254.

Figure 3A:
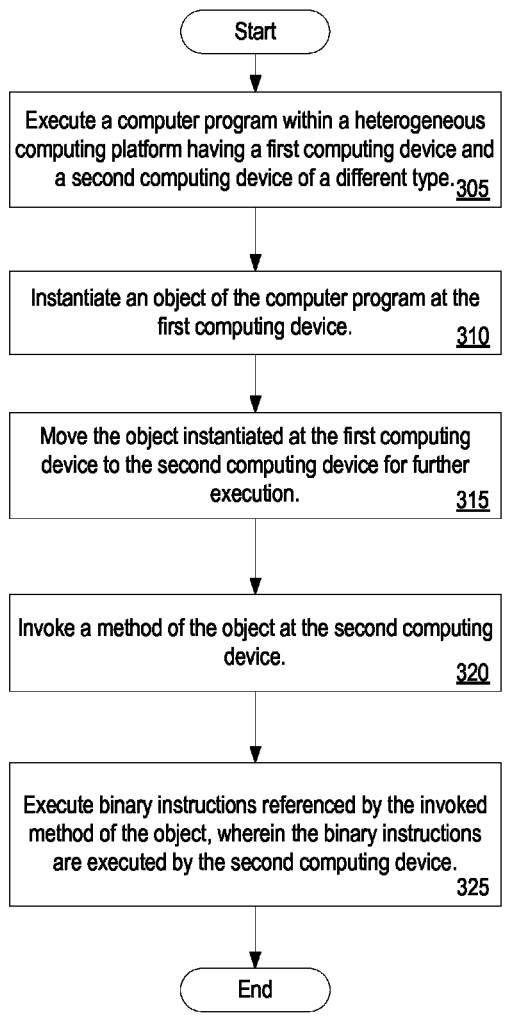

FIGS. 3A and 3B set forth flow diagrams illustrating methods 300 and 301 for enabling polymorphic objects across devices in a heterogeneous platform in accordance with described embodiments. Methods 300 and 301 may be performed by processing logic that may include hardware (e.g., circuitry, dedicated logic, programmable logic, microcode, etc.), including that of a client, services provider, compiler system, development system, etc. The numbering of the blocks presented is for the sake of clarity and is not intended to prescribe an order of operations in which the various blocks must occur.

At FIG. 3A, method 300 begins with processing logic for executing a computer program within a heterogeneous computing platform having a first computing device and a second computing device of a different type (block 305).

At block 310, processing logic instantiates an object of the computer program at the first computing device.

At block 315, processing logic moves the object instantiated at the first computing device to the second computing device for further execution.

At block 320, processing logic invokes a method of the object at the second computing device.

At block 325, processing logic executes binary instructions referenced by the invoked method of the object, in which the binary instructions are executed by the second computing device.

Turning now to FIG. 3B, method 301 begins with processing logic for executing a computer program within a heterogeneous computing platform having a first computing device and a second computing device of a different type. (block 350).

At block 355, processing logic instantiates an object of the computer program.

At block 360, processing logic follows a pointer from a vtable handle of the object to a device specific vtable for the object based on which of the first or second computing device the instantiated object is presently executing.

At decision point 362, the device aware vtable handle determines whether the object being referenced is executing presently at the first computing device or executing presently at the second computing device.

If the object is executing presently at the first computing device, the flow advances to block 365, where processing logic then follows a pointer from a vtable specific to the first device for the object to a binary executable instruction compatible with an instruction set of the first device corresponding to a method for the object.

Flow then proceeds to block 370, where processing logic executes the binary executable instruction at the first device, in which the binary executable instruction is not compatible with the second device. Flow then ends.

Alternatively, if at decision point 362, the object is executing presently at the second computing device, the flow advances instead to block 375, where processing logic then follows a pointer from a vtable specific to the second device for the object to a binary executable instruction compatible with an instruction set of the second device corresponding to a method for the object.

Flow then proceeds to block 380, where processing logic executes the binary executable instruction at the second device, in which the binary executable instruction is not compatible with the first device. Flow then ends.

In such an embodiment, blocks 360 365, and 375 with decision point 362 collectively constitute a two-stage indirection 399 scheme.

Figure 4A:
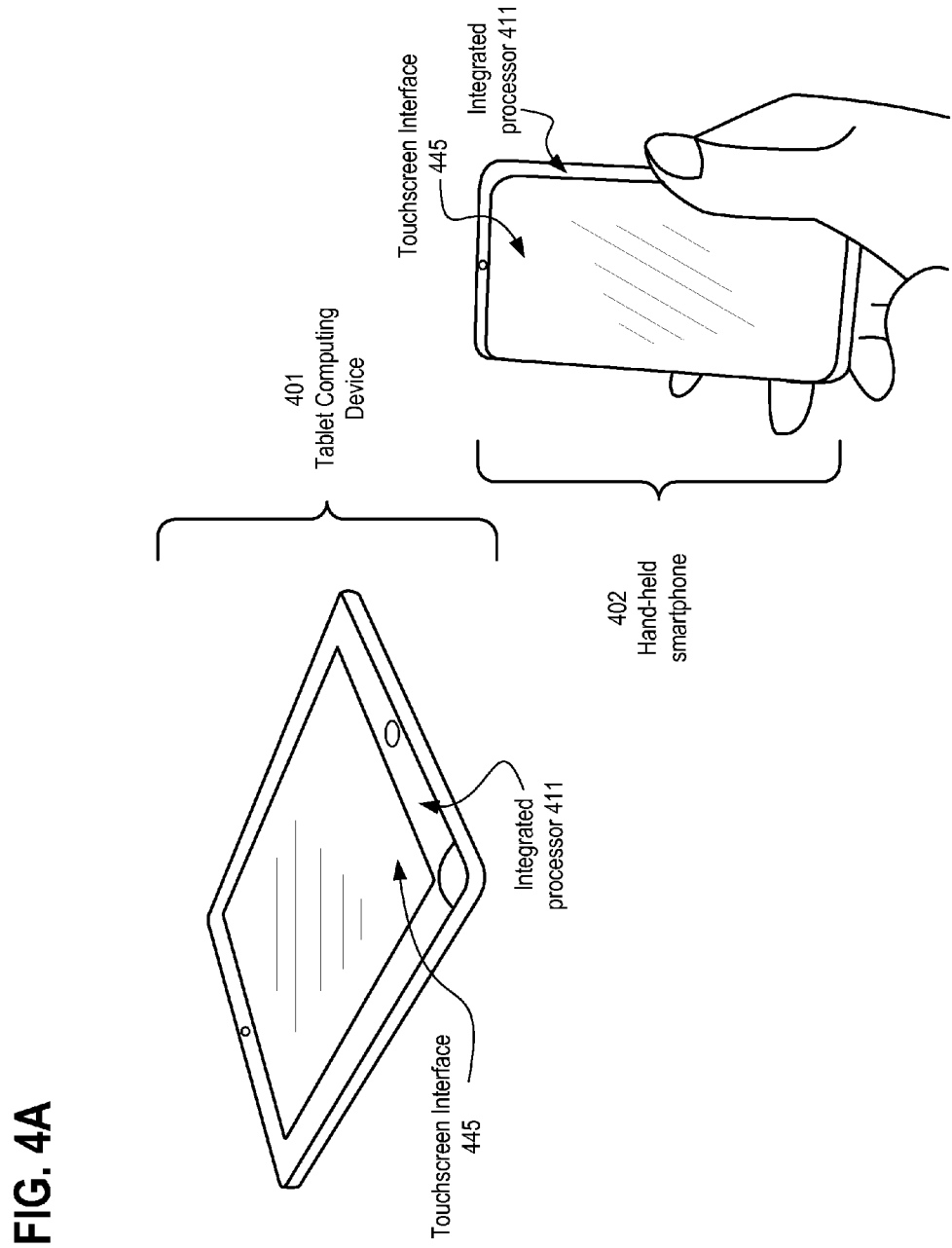
FIG. 4A depicts a tablet computing device and a hand-held smartphone each having a circuitry, components, and functionality integrated therein as described in accordance with the embodiments.

FIG. 4A depicts a tablet computing device 401 and a hand-held smartphone 402 each having a circuitry, components, and functionality integrated therein as described in accordance with the embodiments, such as a compiler and computing devices for executing binary instructions along with other necessary hardware and functionality to enable polymorphic objects across devices in a heterogeneous platform. As depicted, each of the tablet computing device 401 and the hand-held smartphone 402 include a touchscreen interface 445 and an integrated processor 411 in accordance with disclosed embodiments.

For example, in one embodiment, a client, such as heterogeneous computing platform 215 from FIG. 2A may be embodied by a tablet computing device 401 or a hand-held smartphone 402, in which a display unit of the apparatus includes the touchscreen interface 445 for the tablet or smartphone and further in which memory and an integrated circuit operating as an integrated processor 411 are incorporated into the tablet or smartphone. In such an embodiment, the integrated processor 411 implements functionality to enable polymorphic objects across devices in a heterogeneous platform according to the techniques described above.

Figure 4B:
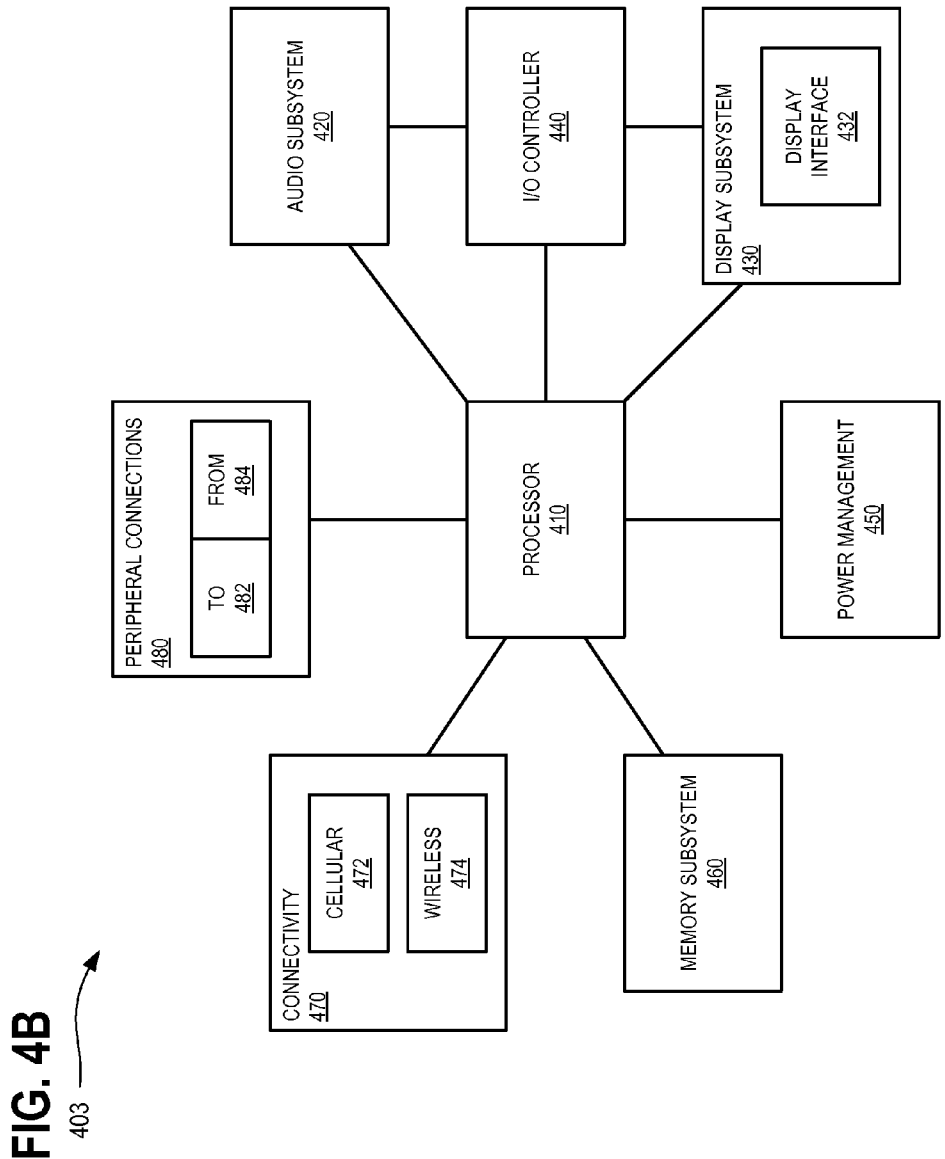
FIG. 4B is a block diagram of an embodiment of tablet computing device, a smart phone, or other mobile device in which touchscreen interface connectors are used.

FIG. 4B is a block diagram 403 of an embodiment of a tablet computing device, a smart phone, or other mobile device in which touchscreen interface connectors are used. Processor 410 performs the primary processing operations. Audio subsystem 420 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 410.

Display subsystem 430 represents hardware (e.g., display devices) and software (e.g., drivers) components that provide a visual and/or tactile display for a user to interact with the tablet computing device or smart phone. Display subsystem 430 includes display interface 432, which includes the particular screen or hardware device used to provide a display to a user. In one embodiment, display subsystem 430 includes a touchscreen device that provides both output and input to a user.

I/O controller 440 represents hardware devices and software components related to interaction with a user. I/O controller 440 can operate to manage hardware that is part of audio subsystem 420 and/or display subsystem 430. Additionally, I/O controller 440 illustrates a connection point for additional devices that connect to the tablet computing device or smart phone through which a user might interact. In one embodiment, I/O controller 440 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 450 that manages battery power usage, charging of the battery, and features related to power saving operation. Memory subsystem 460 includes memory devices for storing information in the tablet computing device or smart phone. Connectivity 470 includes hardware devices (e.g., wireless and/or wired connectors and communication hardware) and software components (e.g., drivers, protocol stacks) to the tablet computing device or smart phone to communicate with external devices. Cellular connectivity 472 may include, for example, wireless carriers such as GSM (global system for mobile communications), CDMA (code division multiple access), TDM (time division multiplexing), or other cellular service standards). Wireless connectivity 474 may include, for example, activity that is not cellular, such as personal area networks (e.g., Bluetooth), local area networks (e.g., WiFi), and/or wide area networks (e.g., WiMax), or other wireless communication.

Peripheral connections 480 include hardware interfaces and connectors, as well as software components (e.g., drivers, protocol stacks) to make peripheral connections as a peripheral device ("to" 482) to other computing devices, as well as have peripheral devices ("from" 484) connected to the tablet computing device or smart phone, including, for example, a "docking" connector to connect with other computing devices. Peripheral connections 480 include common or standards-based connectors, such as a Universal Serial Bus (USB) connector, DisplayPort including MiniDisplayPort (MDP), High Definition Multimedia Interface (HDMI), Firewire, etc.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent data base implementations), which communicate with each other via a bus 530. Main memory 504 includes information and instructions and software program components necessary for performing and executing the functions with respect to the various embodiments of the systems, methods, and entities as described herein including the client, attestation verifier, upgrade service provider and the services provider. Binary executable instructions 524 for each of multiple non-uniform computing devices capable of executing instructions may be stored within main memory 504. Polymorphic objects 523 capable of instantiation and execution at one or multiple of non-uniform computing devices may be stored within main memory 504. Main memory 504 and its sub-elements (e.g. 523 and 524) are operable in conjunction with processing logic 526 and/or software 522 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include one or more network interface cards 508 to communicatively interface the computer system 500 with one or more networks 520, such as the Internet or a publicly accessible network. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.). Compiler 534 may optionally be integrated into the exemplary machine 500.

The secondary memory 518 may include a non-transitory machine-readable storage medium (or more specifically a non-transitory machine-accessible storage medium) 531 on which is stored one or more sets of instructions (e.g., software 522) embodying any one or more of the methodologies or functions described herein. Software 522 may also reside, or alternatively reside within main memory 504, and may further reside completely or at least partially within the processor 502 during execution thereof by the computer system 500, the main memory 504 and the processor 502 also constituting machine-readable storage media. The software 522 may further be transmitted or received over a network 520 via the network interface card 508.

In accordance with the preceding disclosure, the following exemplary embodiments are presented as follows:

According to a first embodiment there is a method having the following operations: receiving, at a device aware compiler, source code for a computer program as input; compiling the source code for the computer program, in which the compiling includes at least: generating two distinct sets of executable binary instructions for a method of an object; in which a first of the two distinct sets of executable binary instructions for the method of the object provides first binary instructions for the method executable by a first computing device and not executable by a second computing device; and in which a second of the two distinct sets of executable binary instructions for the method of the object provides second binary instructions for the method executable by the second computing device and not executable by the first computing device.

According to an embodiment of the method, the device aware compiler compiles the two distinct sets of executable binary instructions for a heterogeneous computing platform having both the first computing device and the second computing device embodied therein.

According to an embodiment of the method, compiling the source code for the computer program includes compiling the source code for a heterogeneous computing platform, distinct from a system within which the device aware compiler operates; in which the first computing device includes a Central Processing Unit (CPU) of the heterogeneous computing platform; and in which the second computing device includes a Graphics Processing Unit (GPU) of the heterogeneous computing platform.

According to an embodiment of the method, the CPU includes a first instruction set which is incompatible with the GPU; and in which the GPU includes a second instruction set which is incompatible with the CPU.

According to an embodiment of the method, the source code for the computer program received as input at the device aware compiler is device agnostic source code; and in which compiling the source code for the computer program includes compiling the device agnostic source code for the computer program via the device aware compiler; and in which the compiling includes at least: generating CPU-specific executable binary instructions for the method of the object for execution by the CPU of the heterogeneous computing platform when the object resides at the CPU and method is referenced for execution by the CPU; and generating GPU-specific executable binary instructions for the method of the object for execution by the GPU of the heterogeneous computing platform when the object resides at the GPU and method is referenced for execution by the GPU.

According to an embodiment of the method, each of the first computing device and the second computing device are selected from a group including: (i) a Central Processing Unit (CPU) at a heterogeneous computing platform, (ii) a Graphics Processing Unit (GPU) at the heterogeneous computing platform, (iii) an accelerator device capable of executing binary instructions at the heterogeneous computing platform, and (iv) an imaging device capable of executing binary instructions at the heterogeneous computing platform; and in which each of the first computing device and the second computing device selected are distinct from one another within the heterogeneous computing platform, the heterogeneous computing platform being distinct from a system within which the device aware compiler operates.

According to an embodiment of the method, each of the first computing device and the second computing device embody different instruction sets.

According to an embodiment of the method, the different instruction set for each of the first computing device and the second computing device requires a first set of binary executable instructions for the first computing device to execute the method of the of the object at the first computing device and a second set of binary executable instructions for the second computing device, different than the first set of binary executable instructions, to execute the method of the of the object at the second computing device.

According to an embodiment of the method, each of the first computing device and the second computing device utilize shared memory within the heterogeneous computing platform; and in which the first set of binary executable instructions for the first computing device and the second set of binary executable instructions for the second computing device both reside within the shared memory at distinct locations.

According to an embodiment of the method, each of the first computing device and the second computing device utilize exclusive address space for their respective binary instructions; in which the first set of binary executable instructions for the first computing device resides within a first data structure of the exclusive address space for the first computing device; in which the second set of binary executable instructions for the second computing device resides within a second data structure both of the exclusive address space for the second computing device; and in which the first data structure is different than the second data structure.

According to an embodiment of the method, the computer program received as input for compiling includes a plurality of polymorphic objects, each capable of instantiation within the heterogeneous computing platform, and each capable of being copied, moved, or transitioned between the first and second computing devices of the heterogeneous computing platform.

According to an embodiment of the method, the heterogeneous computing platform is embodied within one of a tablet computing device or a smartphone distinct from a system within which the device aware compiler operates.

According to an embodiment of the method, the two distinct sets of executable binary instructions are to be executed at the heterogeneous computing platform by: referencing the binary instructions for the first computing device through a two-stage indirection scheme via a handle indicating the object is executing at the first computing device or referencing the binary instructions for the second computing device through a two-stage indirection scheme via a handle indicating the object is executing at the second computing device; and in which the two-stage indirection scheme is to indicate, via the handle, in which the object is executing without regard to which of the first computing device or the second computing device originally instantiated the object.

According to an embodiment of the method, the compiling further includes generating the two-stage indirection scheme; and in which the two-stage indirection scheme includes: referencing a first virtual function table (vtable) specific to the first computing device and embodied therein; referencing a second vtable specific to the second computing device and embodied therein; the first and second vtable having identical array sizes; and in which the device aware compiler renders an index for each of the first and second computing devices into the first and second vtables specific to the first and second computing devices individually.

According to an embodiment of the method, the device aware compiler renders a vtable for each of the first and second computing devices for every object of the computer program which is capable of execution at each of the first and second computing devices.

According to an embodiment of the method, each of the respective first and second vtables include pointers from the method of the object to device specific binary instructions executable at the respective first or second computing device.

According to an embodiment of the method, the two-stage indirection scheme includes: the first computing device having embodied therein a first array of vtables for each of a plurality of base classes which is capable of execution at the first computing device; the second computing device having embodied therein a second array of vtables for each of the plurality of base classes which is capable of execution at the second computing device; each vtable within the first array of vtables corresponding to a vtable in the second array of vtables, the corresponding vtables being identical in size; and in which the device aware compiler provides a referenceable handle for each of the plurality of base classes, the handle operable as an array index, in which each vtable array size equals a number of derived classes for each base class among the plurality of base classes.

According to an embodiment of the method, the two-stage indirection scheme includes: the first computing device having embodied therein a first hash table of vtables for each of a plurality of classes within the computer program; the second computing device having embodied therein a second hash table of vtables for each of the plurality of classes within the computer program; in which the first hash table of vtables and the second hash table of vtables differ in size due to one or more of the plurality of classes within the computer program being instantiated at one but not both of the first and second computing devices; and in which the device aware compiler renders a vtable handle formed from unique hash keys corresponding to a mangled class name for each of the plurality of classes within the computer program, each of the unique hash keys pointing to a device specific vtable for the corresponding class at one of the first or second computing devices.

According to an embodiment of the method, the two-stage indirection scheme includes: the first computing device having embodied therein a first hash table of vtables for each of a plurality of classes within the computer program; the second computing device having embodied therein a second hash table of vtables for each of the plurality of classes within the computer program; in which the first hash table of vtables and the second hash table of vtables differ in size due to one or more of the plurality of classes within the computer program being instantiated at one but not both of the first and second computing devices; and in which the device aware compiler renders a vtable handle formed from unique hash keys, each of the unique hash keys being a function of a mangled class name for each of the plurality of classes within the computer program.

According to an embodiment of the method, the two-stage indirection scheme includes: the first computing device having embodied therein a first hash table of vtables for each of a plurality of classes within the computer program; the second computing device having embodied therein a second hash table of vtables for each of the plurality of classes within the computer program; in which the first hash table of vtables and the second hash table of vtables differ in size due to one or more of the plurality of classes within the computer program being instantiated at one but not both of the first and second computing devices; and in which the device aware compiler renders a vtable handle formed by assigning every class among the plurality of classes for the computer program a global Unique Identifier (UID).

According to an embodiment of the method, the device aware compiler operates within a compiler system; and in which the method further includes: installing the two distinct sets of executable binary instructions for the computer program to the heterogeneous computing platform, distinct from the compiler system; executing the two distinct sets of executable binary instructions at the heterogeneous computing platform.

According to an embodiment of the method, executing the two distinct sets of executable binary instructions at the heterogeneous computing platform, includes: executing the computer program within the heterogeneous computing platform having the first computing device and the second computing device, each of a different type; instantiating the object of the computer program at the first computing device; moving the object instantiated at the first computing device to the second computing device for further execution; invoking the method of the object at the second computing device; and executing binary instructions referenced by the invoked method of the object, in which the binary instructions are executed by the second computing device.

According to an embodiment of the method, moving the object instantiated at the first computing device to the second computing device for further execution includes moving an object instantiated at a Central Processing Unit (CPU) of the heterogeneous computing platform to a Graphics Processing Unit (GPU) of the heterogeneous computing platform for further execution.

There is according to another embodiment, one or more non-transitory computer readable storage media having instructions stored thereon that, when executed by a compiler system, the instructions cause the compiler system to perform operations including: receiving, at a device aware compiler, source code for a computer program as input; compiling the source code for the computer program, in which the compiling includes at least: generating two distinct sets of executable binary instructions for a method of an object; in which a first of the two distinct sets of executable binary instructions for the method of the object provides first binary instructions for the method executable by a first computing device and not executable by a second computing device; and in which a second of the two distinct sets of executable binary instructions for the method of the object provides second binary instructions for the method executable by the second computing device and not executable by the first computing device.

According to another embodiment of the one or more non-transitory computer readable storage media, in which each of the first computing device and the second computing device embody different instruction sets.

According to another embodiment of the one or more non-transitory computer readable storage media, in which the different instruction set for each of the first computing device and the second computing device requires a first set of binary executable instructions for the first computing device to execute the method of the of the object at the first computing device and a second set of binary executable instructions for the second computing device, different than the first set of binary executable instructions, to execute the method of the of the object at the second computing device.

According to another embodiment of the one or more non-transitory computer readable storage media, the heterogeneous computing platform is embodied within one of a tablet computing device or a smartphone distinct from the compiler system.

There is a computing device in accordance with one embodiment, in which the computing device includes: a Central Processing Unit (CPU) embodying a first instruction set; a Graphics Processing Unit (GPU) embodying a second instruction set different than the first instruction set of the CPU; a shared memory operable in conjunction with both the CPU and the GPU; and a computer program having a plurality of objects capable of instantiation and execution at one or both of the GPU and the CPU; in which the computer program causes the computing device to: (i) instantiate one of the plurality of objects of the computer program at the CPU, (ii) move the object instantiated at the CPU to the GPU for further execution, (iii) invoke a method of the object at the GPU, and (iv) execute binary instructions referenced by the invoked method of the object, in which the binary instructions are executed by the GPU.

According to another embodiment of the computing device, the computing device is embodied within one of a tablet computing device or a smartphone.

According to another embodiment of the computing device, the computer program is compiled by a device aware compiler compatible with both the GPU and the CPU of the tablet computing device or smartphone, and further in which the computer program is downloaded to the tablet computing device or smartphone for execution.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
receiving, at a device aware compiler, source code for a computer program as input;
compiling the source code for the computer program, wherein the compiling includes at least:
generating two distinct sets of executable binary instructions for a method of an object, a first of the two distinct sets of executable binary instructions executable by a first computing device and not executable by a second computing device, and a second of the two distinct sets of executable binary instructions executable by the second computing device and not executable by the first computing device;
enabling device aware execution of the two distinct sets of executable binary instructions using a two-stage indirection scheme, the two-stage indirection scheme including:
encoding a handle to a shared virtual function table (vtable), the handle indicating at which of the first and second computing devices the object is executing without regard to where the object was originally instantiated; and
performing a look up to a device-specific vtable based on the handle to the shared vtable, the device specific vtable having a pointer to one of the two distinct sets of executable binary instructions executable by a respective one of the first and second computing devices at which the object is executing, wherein performing the look up includes:
referencing a first device specific vtable specific to the first computing device and embodied therein; and
referencing a second device specific vtable specific to the second computing device and embodied therein.

2. The method of claim 1, wherein the device aware compiler compiles the two distinct sets of executable binary instructions for a heterogeneous computing platform having both the first computing device and the second computing device embodied therein.

3. The method of claim 1:
wherein compiling the source code for the computer program comprises compiling the source code for a heterogeneous computing platform, distinct from a system within which the device aware compiler operates;
wherein the first computing device includes a Central Processing Unit (CPU) of the heterogeneous computing platform; and
wherein the second computing device includes a Graphics Processing Unit (GPU) of the heterogeneous computing platform.

4. The method of claim 3:
wherein the CPU includes a first instruction set which is incompatible with the GPU; and
wherein the GPU includes a second instruction set which is incompatible with the CPU.

5. The method of claim 4:
wherein the source code for the computer program received as input at the device aware compiler is device agnostic source code; and
wherein compiling the source code for the computer program comprises compiling the device agnostic source code for the computer program via the device aware compiler; and
wherein the compiling includes at least:
generating CPU-specific executable binary instructions for the method of the object for execution by the CPU of a heterogeneous computing platform when the object resides at the CPU and the method is referenced for execution by the CPU; and
generating GPU-specific executable binary instructions for the method of the object for execution by the GPU of the heterogeneous computing platform when the object resides at the GPU and the method is referenced for execution by the GPU.

6. The method of claim 1:
wherein each of the first computing device and the second computing device are selected from a group including:
(i) a Central Processing Unit (CPU) at a heterogeneous computing platform,
(ii) a Graphics Processing Unit (GPU) at the heterogeneous computing platform,
(iii) an accelerator device capable of executing binary instructions at the heterogeneous computing platform, and
(iv) an imaging device capable of executing binary instructions at the heterogeneous computing platform; and
wherein each of the first computing device and the second computing device selected are distinct from one another within the heterogeneous computing platform, the heterogeneous computing platform being distinct from a system within which the device aware compiler operates.

7. The method of claim 1, wherein each of the first computing device and the second computing device embody different instruction sets.

8. The method of claim 7, wherein the different instruction set for each of the first computing device and the second computing device requires a first set of binary executable instructions for the first computing device to execute the method of the of the object at the first computing device and a second set of binary executable instructions for the second computing device, different than the first set of binary executable instructions, to execute the method of the of the object at the second computing device.

9. The method of claim 8:
wherein each of the first computing device and the second computing device utilize shared memory within a heterogeneous computing platform; and
wherein the first set of binary executable instructions for the first computing device and the second set of binary executable instructions for the second computing device both reside within the shared memory at distinct locations.

10. The method of claim 8:
wherein each of the first computing device and the second computing device utilize exclusive address space for their respective binary instructions;
wherein the first set of binary executable instructions for the first computing device resides within a first data structure of the exclusive address space for the first computing device;
wherein the second set of binary executable instructions for the second computing device resides within a second data structure both of the exclusive address space for the second computing device; and
wherein the first data structure is different than the second data structure.

11. The method of claim 1, wherein the computer program received as input for compiling includes a plurality of polymorphic objects, each capable of instantiation within a heterogeneous computing platform, and each capable of being copied, moved, or transitioned between the first and second computing devices of the heterogeneous computing platform.

12. The method of claim 1, wherein a heterogeneous computing platform is embodied within one of a tablet computing device or a smartphone distinct from a system within which the device aware compiler operates.

13. The method of claim 1, wherein
the first and second vtable having identical array sizes; and
the device aware compiler renders an index for each of the first and second computing devices into the first and second vtables specific to the first and second computing devices individually.

14. The method of claim 13, wherein the device aware compiler renders a vtable for each of the first and second computing devices for every object of the computer program which is capable of execution at each of the first and second computing devices.

15. The method of claim 13, wherein each of the respective first and second vtables include pointers from the method of the object to device specific binary instructions executable at the respective first or second computing device.

16. The method of claim 1, wherein the two-stage indirection scheme includes:
the first computing device having embodied therein a first array of vtables for each of a plurality of base classes which is capable of execution at the first computing device;
the second computing device having embodied therein a second array of vtables for each of the plurality of base classes which is capable of execution at the second computing device;
each vtable within the first array of vtables corresponding to a vtable in the second array of vtables, the corresponding vtables being identical in size; and
wherein the device aware compiler provides a referenceable handle for each of the plurality of base classes, the handle operable as an array index, wherein each vtable array size equals a number of derived classes for each base class among the plurality of base classes.

17. The method of claim 1, wherein the two-stage indirection scheme includes:
the first computing device having embodied therein a first hash table of vtables for each of a plurality of classes within the computer program;
the second computing device having embodied therein a second hash table of vtables for each of the plurality of classes within the computer program;
wherein the first hash table of vtables and the second hash table of vtables differ in size due to one or more of the plurality of classes within the computer program being instantiated at one but not both of the first and second computing devices; and
wherein the device aware compiler renders a vtable handle formed from unique hash keys corresponding to a mangled class name for each of the plurality of classes within the computer program, each of the unique hash keys pointing to a device specific vtable for the corresponding class at one of the first or second computing devices.

18. The method of claim 1, wherein the two-stage indirection scheme includes:
the first computing device having embodied therein a first hash table of vtables for each of a plurality of classes within the computer program;
the second computing device having embodied therein a second hash table of vtables for each of the plurality of classes within the computer program;
wherein the first hash table of vtables and the second hash table of vtables differ in size due to one or more of the plurality of classes within the computer program being instantiated at one but not both of the first and second computing devices; and
wherein the device aware compiler renders a vtable handle formed from unique hash keys, each of the unique hash keys being a function of a mangled class name for each of the plurality of classes within the computer program.

19. The method of claim 1, wherein the two-stage indirection scheme includes:
the first computing device having embodied therein a first hash table of vtables for each of a plurality of classes within the computer program;
the second computing device having embodied therein a second hash table of vtables for each of the plurality of classes within the computer program;
wherein the first hash table of vtables and the second hash table of vtables differ in size due to one or more of the plurality of classes within the computer program being instantiated at one but not both of the first and second computing devices; and
wherein the device aware compiler renders a vtable handle formed by assigning every class among the plurality of classes for the computer program a global Unique Identifier (UID).

20. The method of claim 1:
wherein the device aware compiler operates within a compiler system; and
wherein the method further comprises:
installing the two distinct sets of executable binary instructions for the computer program to a heterogeneous computing platform, distinct from the compiler system;
executing the two distinct sets of executable binary instructions at the heterogeneous computing platform.

21. The method of claim 20, wherein executing the two distinct sets of executable binary instructions at a heterogeneous computing platform, comprises:
executing the computer program within the heterogeneous computing platform having the first computing device and the second computing device, each of a different type;
instantiating the object of the computer program at the first computing device;
moving the object instantiated at the first computing device to the second computing device for further execution;
invoking the method of the object at the second computing device; and
executing binary instructions referenced by the invoked method of the object, wherein the binary instructions are executed by the second computing device.

22. The method of claim 21, wherein moving the object instantiated at the first computing device to the second computing device for further execution includes moving an object instantiated at a Central Processing Unit (CPU) of a heterogeneous computing platform to a Graphics Processing Unit (GPU) of the heterogeneous computing platform for further execution.

23. One or more non-transitory computer readable storage media having instructions stored thereon that, when executed by a compiler system, the instructions cause the compiler system to perform operations including:
receiving, at a device aware compiler, source code for a computer program as input;
compiling the source code for the computer program, wherein the compiling includes at least:
generating two distinct sets of executable binary instructions for a method of an object, a first of the two distinct sets of executable binary instructions executable by a first computing device and not executable by a second computing device, and a second of the two distinct sets of executable binary instructions executable by the second computing device and not executable by the first computing device;

enabling device aware execution of the two distinct sets of executable binary instructions using a two-stage indirection scheme, the two-stage indirection scheme including:

encoding a handle to a shared virtual function table (vtable), the handle indicating at which of the first and second computing devices the object is executing without regard to where the object was originally instantiated; and performing a look up to a device-specific vtable based on the handle to the shared vtable, the device specific vtable having a pointer to one of the two distinct sets of executable binary instructions executable by a respective one of the first and second computing devices at which the object is executing, wherein performing the look up includes:

referencing a first device specific vtable specific to the first computing device and embodied therein; and referencing a second device specific vtable specific to the second computing device and embodied therein.

24. The one or more non-transitory computer readable storage media of claim 23, wherein each of the first computing device and the second computing device embody different instruction sets.

25. The one or more non-transitory computer readable storage media of claim 24, wherein the different instruction set for each of the first computing device and the second computing device requires a first set of binary executable instructions for the first computing device to execute the method of the of the object at the first computing device and a second set of binary executable instructions for the second computing device, different than the first set of binary executable instructions, to execute the method of the of the object at the second computing device.

26. The one or more non-transitory computer readable storage media of claim 23, wherein a heterogeneous computing platform is embodied within one of a tablet computing device or a smartphone distinct from the compiler system.

27. The one or more non-transitory computer readable storage media of claim 23, wherein:

the first and second vtable having identical array sizes; and the device aware compiler renders an index for each of the first and second computing devices into the first and second vtables specific to the first and second computing devices individually.

* * * * *